(12) United States Patent
Poulos

(10) Patent No.: US 7,067,064 B2
(45) Date of Patent: Jun. 27, 2006

(54) DECANTING DEVICE FOR USE ON VESSELS WITH SPILL RAILS

(75) Inventor: John J. Poulos, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 84 days.

(21) Appl. No.: 10/945,766

(22) Filed: Sep. 21, 2004

(65) Prior Publication Data

US 2005/0072723 A1 Apr. 7, 2005

Related U.S. Application Data

(60) Provisional application No. 60/508,359, filed on Oct. 3, 2003.

(51) Int. Cl.
*B01D 17/02* (2006.01)

(52) U.S. Cl. .................. 210/801; 210/153; 210/242.1; 210/538; 137/172; 114/182

(58) Field of Classification Search ............... 210/800, 210/801, 776, 153, 242.1, 242.3, 532.1, 538, 210/540; 137/172; 114/182
See application file for complete search history.

(56) References Cited

U.S. PATENT DOCUMENTS

| | | | | |
|---|---|---|---|---|
| 1,406,950 A | * | 2/1922 | Fackert ..................... 210/800 |
| 1,599,163 A | * | 9/1926 | Buchanan .................. 210/538 |
| 1,634,871 A | * | 7/1927 | Hepler ..................... 210/538 |
| 1,877,507 A | * | 9/1932 | Hendricks .................. 210/538 |
| 2,483,564 A | * | 10/1949 | Sitton ..................... 210/538 |
| 2,679,338 A | * | 5/1954 | Stevens .................... 114/182 |
| 3,265,030 A | * | 8/1966 | Stevens .................... 114/182 |
| 3,789,987 A | * | 2/1974 | Malaspina ................. 210/533 |
| 3,823,828 A | * | 7/1974 | Derzhavets et al. ...... 210/242.3 |
| 4,624,278 A | * | 11/1986 | Delwiche ................... 137/172 |
| 5,725,011 A | * | 3/1998 | Hermensson .............. 137/172 |
| 6,132,603 A | * | 10/2000 | Mokrzycki et al. ......... 210/538 |

* cited by examiner

*Primary Examiner*—Christopher Upton
(74) *Attorney, Agent, or Firm*—Glenn T. Barrett

(57) ABSTRACT

A device for separating water immiscible hydrocarbons from water contained on vessel decks by spill rails with at least one scupper comprises a rigid liquid impermeable body adapted to be attached on the inside of a spill rail at a scupper and which defines with the spill rail a chamber that has an opening at the bottom end of the body which opening is at a level below the bottom of the scupper.

7 Claims, 7 Drawing Sheets

DECANTING DEVICE FOR USE ON VESSELS WITH SPILL RAILS

CROSS REFERENCE TO RELATED APPLICATION

This application claims the benefit of U.S. Provisional Application 60/508,359 filed Oct. 3, 2003, which is based on Information and Belief (03 IB-001)

FIELD OF THE INVENTION

This application claims the benefit of U.S. Ser. No. 60/508,359 filed Oct. 3, 2003.

The present invention relates broadly to the separation of water from water immiscible hydrocarbons. More specifically, the invention relates to a separation device for use on barges and similar vessels with spill rails.

BACKGROUND OF INVENTION

Many maritime vessels such as barges that are used to transport oil and other water immiscible hydrocarbons are provided with spill rails to contain any oil that might be accidentally spilled on the barge deck during loading or unloading operations thereby preventing the undesirable discharge of the oil into the environment. While these spill rails are effective for their intended purpose, they can also result in the accumulation of water on the deck during periods of heavy rainfall. This accumulated water needs to be discharged overboard, and even though any prior spills may have been cleaned the accumulated water can contain anything from patches of water immiscible hydrocarbons floating on the surface of the water up to a thin layer covering substantially the entire surface area of the accumulated water.

An object of the present invention is to provide an apparatus for barges with spill rails which is effective in separating water from water immiscible hydrocarbons. Another object is to effect such separations without any substantial holdup of the water. Another object is to provide such an apparatus at minimal expense.

These and other objectives will become apparent from a reading of the appended description.

SUMMARY OF INVENTION

The separation device of the invention is a rigid liquid impermeable body adapted to be attached on the inside of a vessel spill rail at a scupper and which with the spill rail defines a chamber that has an opening at the bottom of the body. The membrane is of sufficient length to extend to a level below the bottom of the scupper but above the deck where the device is attached to the spill rail. When sufficient water accumulates on the deck to a level above the bottom of the scupper, separations may be effected by opening the scupper thereby allowing the water to flow under the membrane of the separation device and out through the scupper. So long as the water level on the deck remains above the bottom of the scupper the water immiscible hydrocarbons will be retained on the deck and not discharged into the environment. Thus, use of the device of the invention provides a method for preventing the discharge of water immiscible hydrocarbons floating on water contained on the deck of a vessel by spill rails.

DETAILED DESCRIPTION OF THE INVENTION

Figure 1:
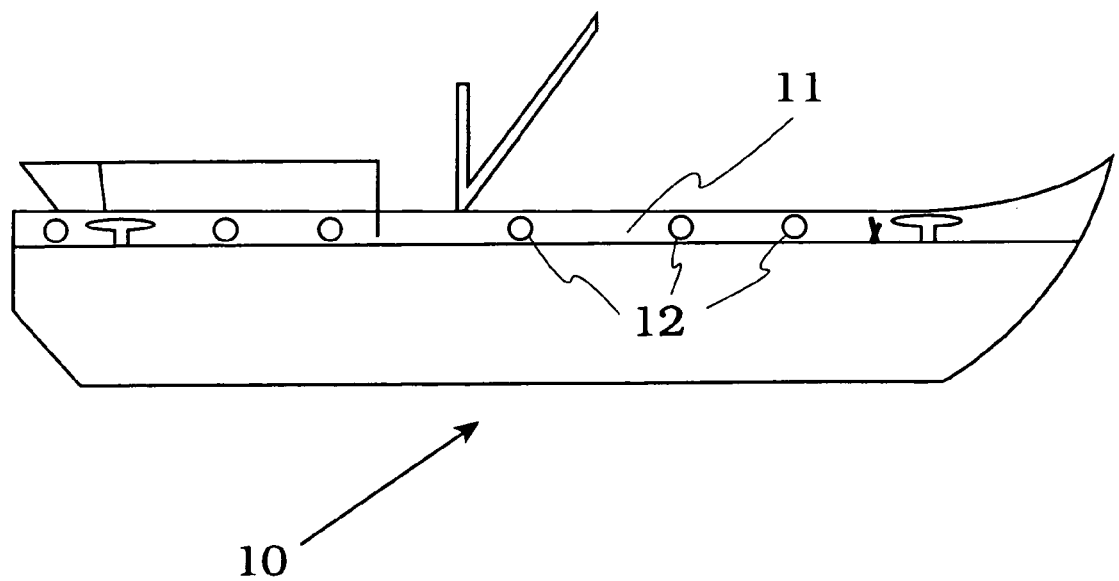
FIG. 1 is a sketch of a vessel having spill rails and scuppers to which the present invention is particularly suitable.

Turning first to FIG. 1 there is shown a maritime vessel 10, such as a barge having a spill rail 11 for the containment of accidentally spilled liquid on the deck of the vessel. A plurality of scuppers 12 are provided in the spill rail. Means (now shown) such as scupper plugs are provided for each scupper to open or close the scupper as the situation dictates. For example, during loading or unloading of a liquid cargo, such as a water immiscible hydrocarbon, the scuppers will be closed to prevent discharge of any accidental spill over board into the surrounding body of water except when using the separation device of the invention as described herein.

The separation device of the invention is a rigid liquid impermeable body that is adapted to be attached on the inside of a vessel spill rail at a scupper. The body may be made of any suitable material including metals such as steel and aluminum, and plastics.

Figure 2:
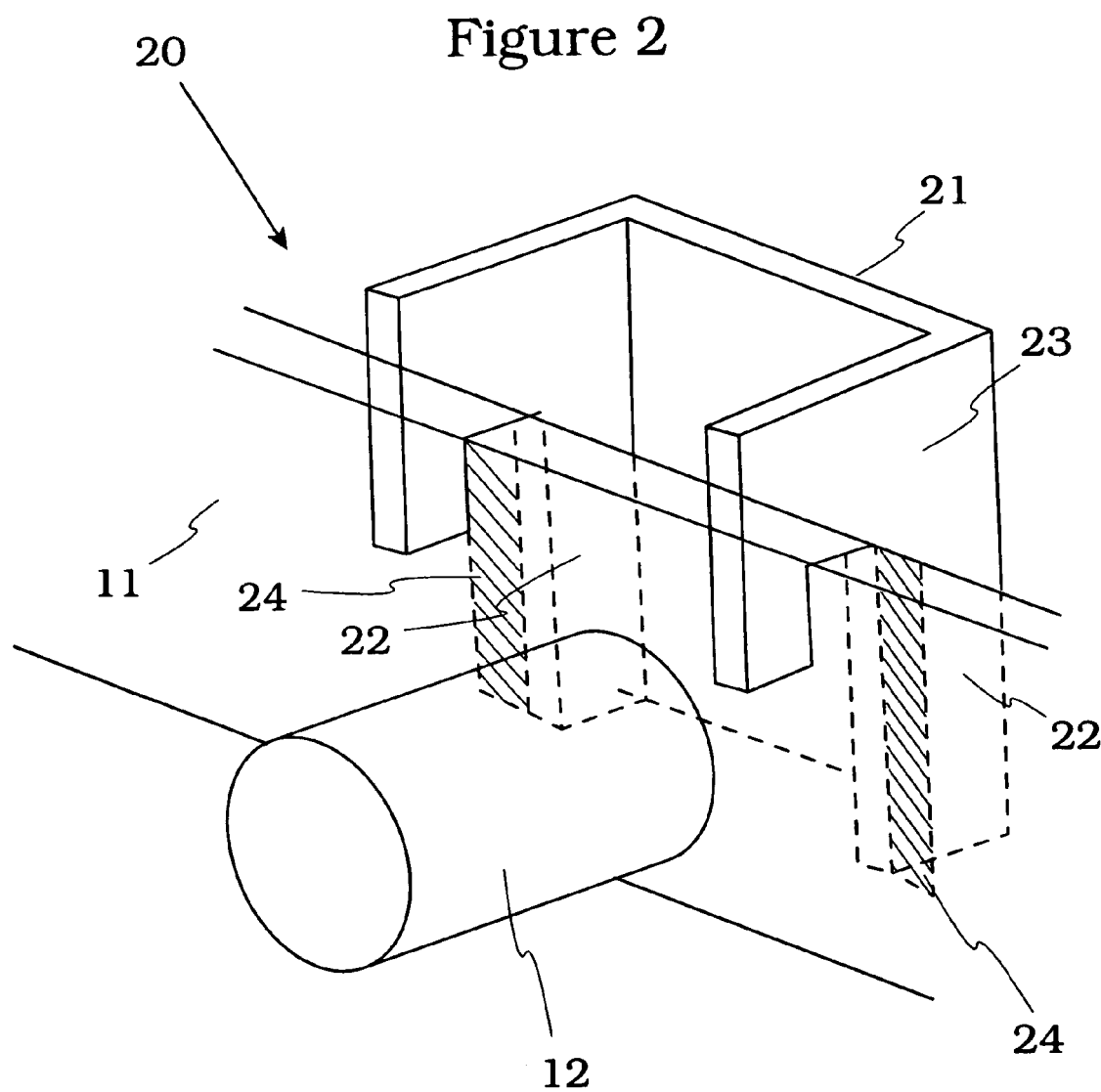
FIG. 2 is a schematic perspective view showing a preferred device of the invention mounted on a spill rail of a vessel.

A preferred embodiment of the device of the invention is shown in FIG. 2. In this embodiment the separation device 20 is a rigid liquid impermeable body that is adapted to be removably attached to the inside of a vessel spill rail 11 at a scupper 12. As shown the device 20 comprises three plates, a first plate 21 and two parallel, spaced apart side plates 22 that extend perpendicularly from first plate 21. The width of plate 21 is at least equal to and preferably greater than the width of the scupper 12. Also, the spacing of the side plates are at least equal to the width of the scupper. The length of plates 21 and 22 are sufficient to at least extend from the top to the bottom of the scupper. Preferably the length of plates 21 and 22 extends from the top of the spill rail 11 to at least the bottom of the scupper 12 and preferably below the bottom of the scupper but above the deck.

In the embodiment shown in FIG. 2, side plates 22 extend upwardly above the spill rail 12. This upper portion 23 is wider than the portion of plate 22 that extends below the spill rail 12. Also, the upper portion 23 has an inverted u-shaped cut out of a size sufficient to fit in a snug relationship over the spill rail 12.

As can be seen in FIG. 2, the device 20 may be and preferably is provided with a pair of flanges 24, extending perpendicularly from plates 22 at the end where the plates engage the spill rail 11. These flanges may be made of any suitable flexible material such as rubber and plastics; hydrostatic pressure provides the seal to prevent water immiscible hydrocarbon from entering from the side of the device.

Figure 3:
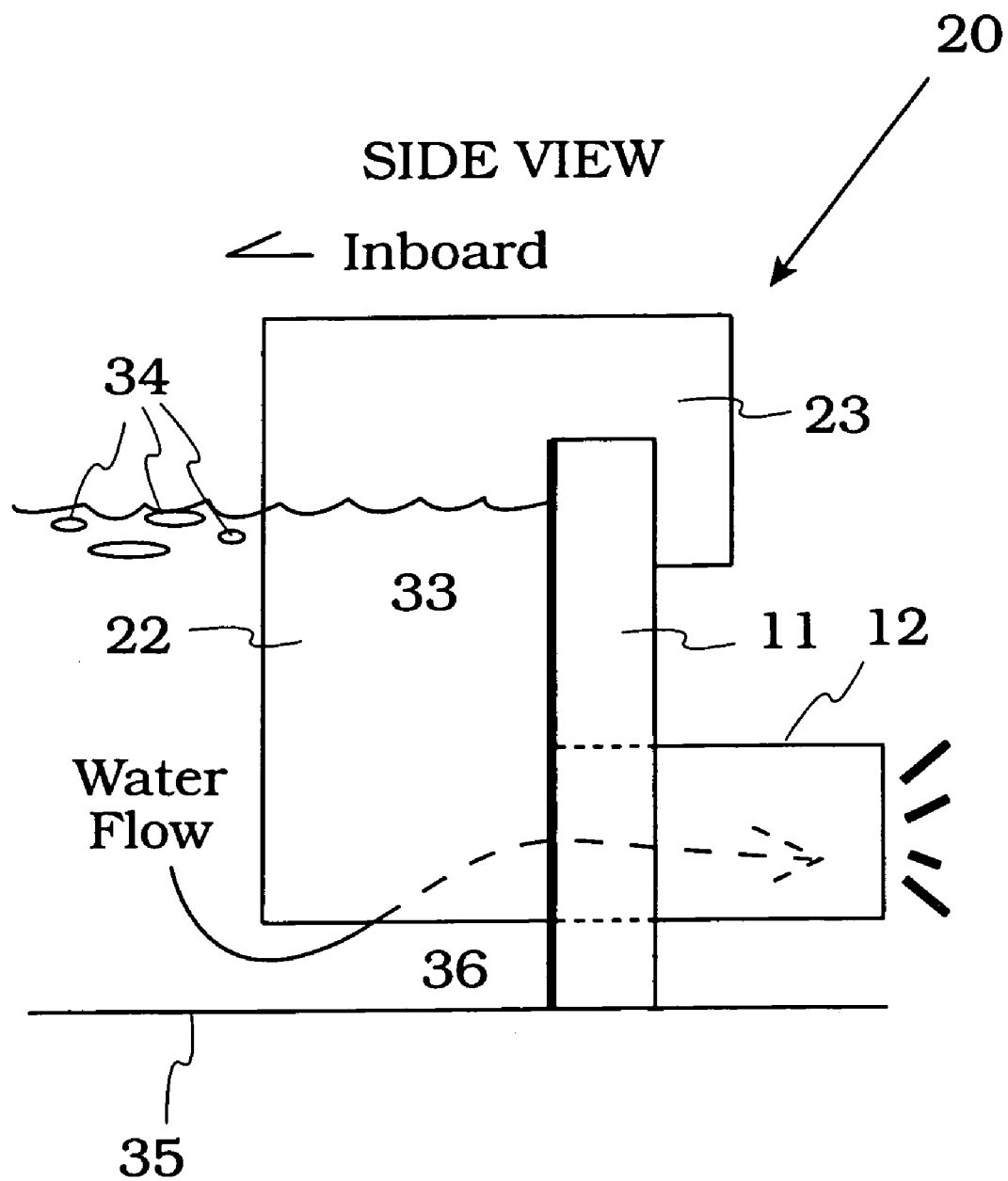
FIG. 3 is a schematic side view illustrating the operation of the device of the invention.

As can be seen in FIG. 3 when device 20 is mounted on the inside of the spill rail 11 it defines a chamber 33 between the spill rail and the device. Also as can be seen in FIG. 3 the device 20 extends to the bottom of the scupper 12 but is sufficiently above the deck 35 to provide a channel 36 for the flow of water.

In operation, with the scupper closed water can accumulate on the deck. In such an instance any residual amounts of an immiscible hydrocarbon that may be on the deck will accumulate on the top of the water as floating patches 34 or even as a more continuous layer (not shown). When the scupper 12 is opened the water will flow under device 20 through the channel 36 and out through the scupper 12. As long as the water level is above the bottom of device 20 the immiscible hydrocarbons will be retained on board and not discharged. Residual water and oil is cleaned using oil sorbent materials or removed to a container using a portable pump or bailer.

Figure 4:
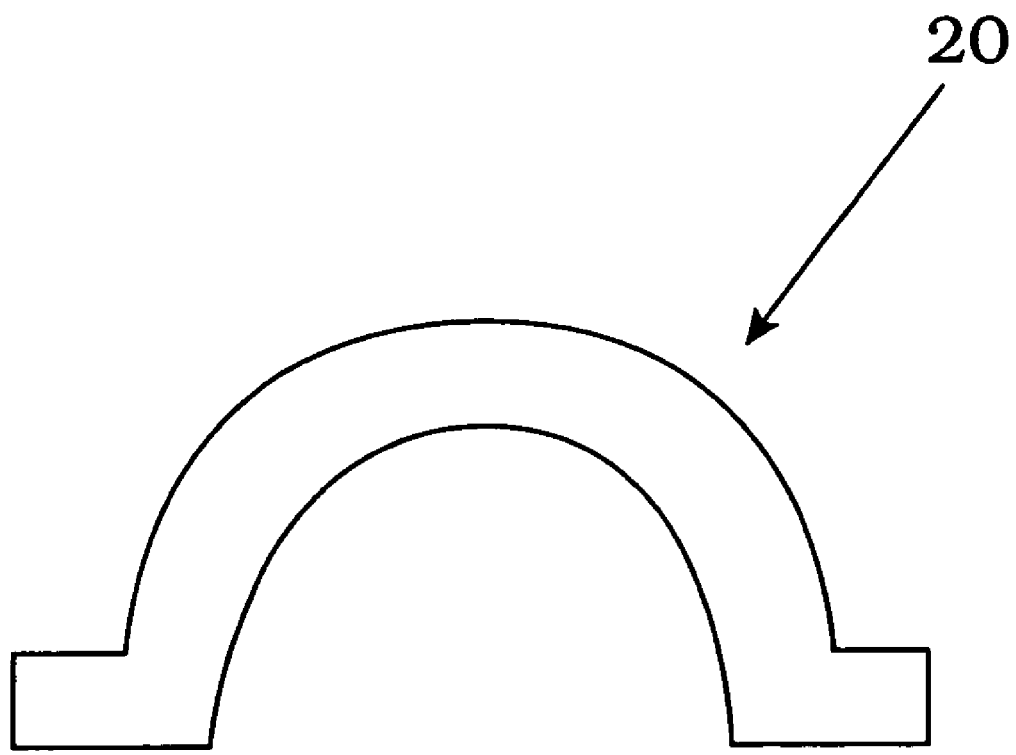
FIGS. 4 to 6 are top views illustrating various shapes of the device of the invention.
Figure 5:
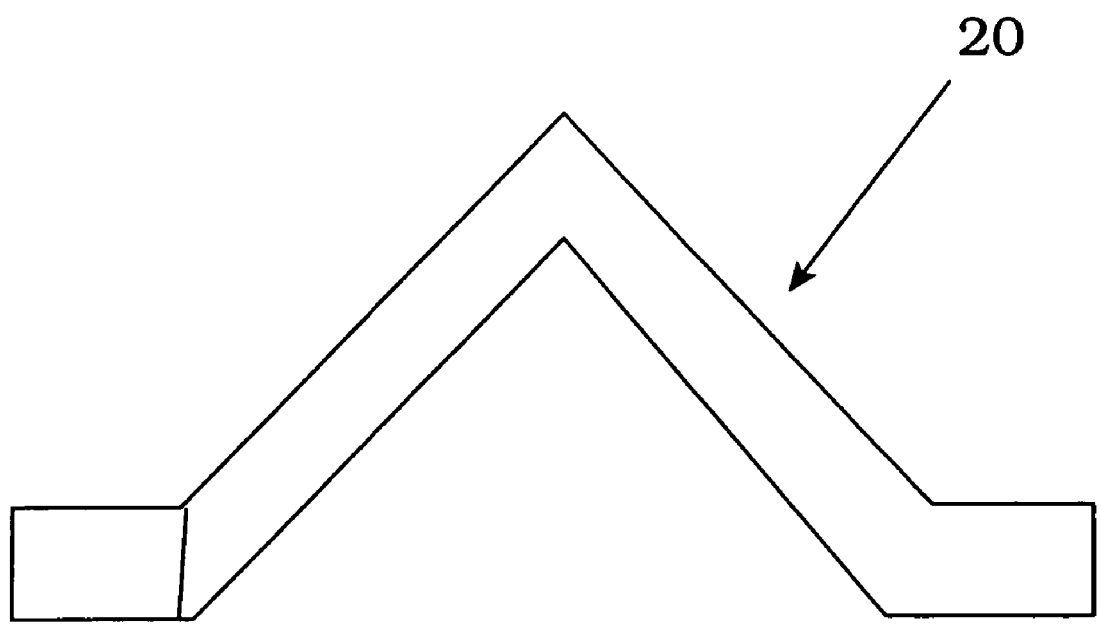
Figure 6:
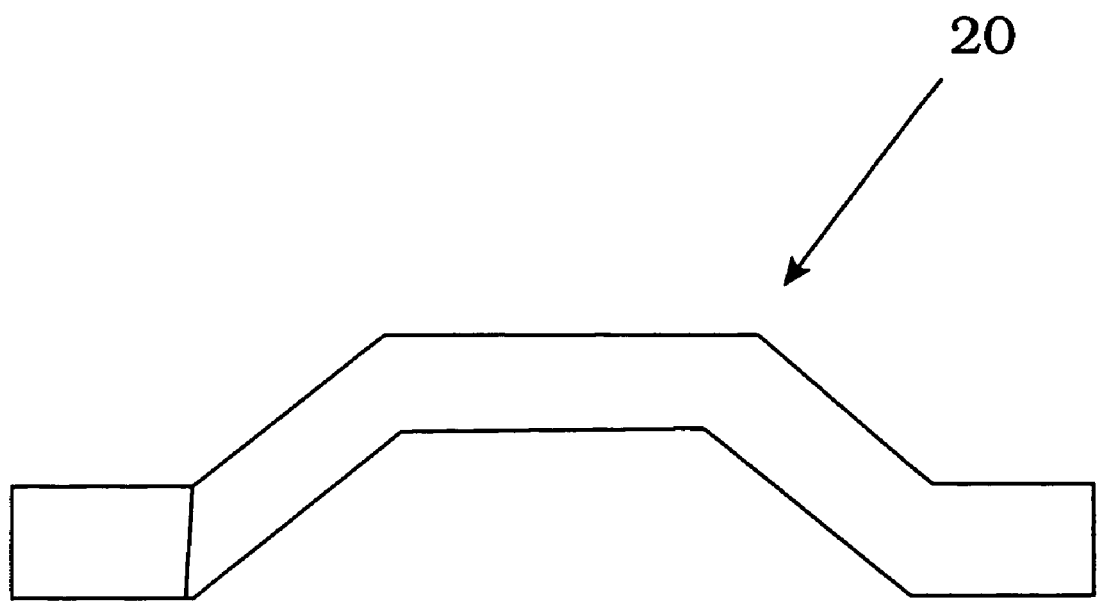

Although in a preferred embodiment the device of the invention is substantially rectangular in shape other shapes such as those illustrated in FIGS. 4 to 6 are within the scope of the invention.

Figure 7:
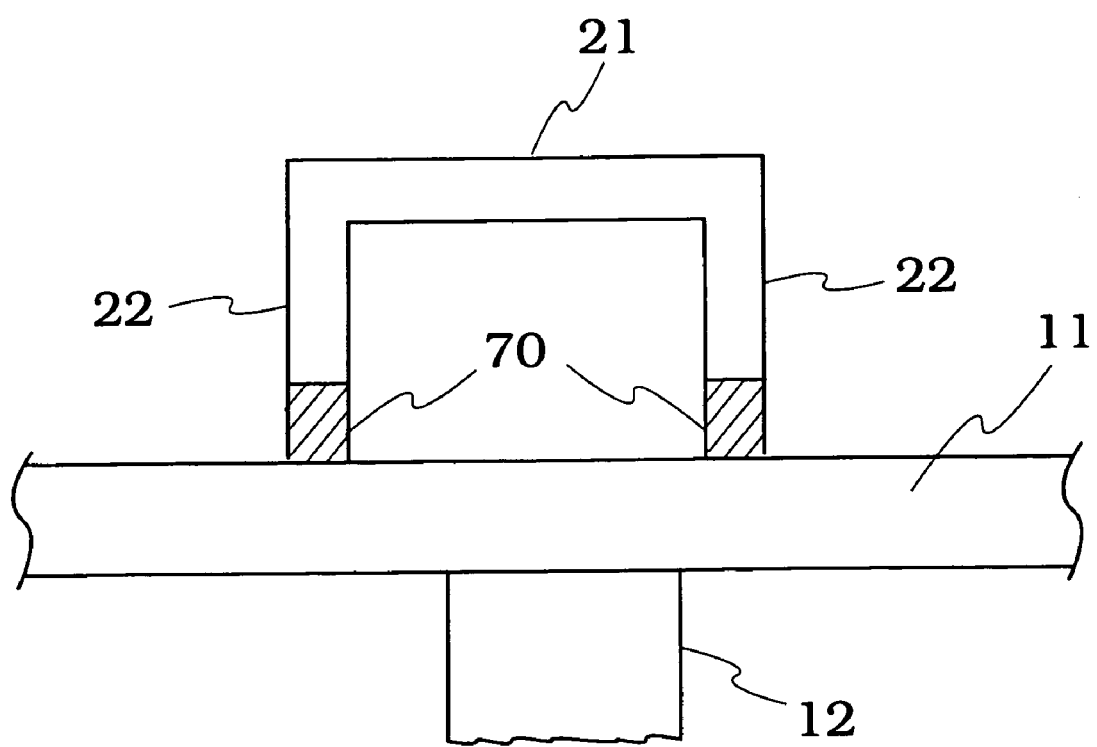
FIG. 7 is a schematic top view illustrating another embodiment of the invention.

In yet another embodiment, in lieu of the flanges 24 of FIG. 2 resilient sealing means may be secured to the faces of the device 20 that is in contact with the spill rail. This is illustrated in FIG. 7 in the context of a rectangular device 20 where the resilient sealing means 70 forms the requisite seal. Sealing means 60 may be constructed of rubber or plastics including dense foams.

The present invention is, of course, in no way restricted to the specific embodiments, structural and procedural details disclosed herein but also encompasses modifications or equivalents within the scope of the appended claims.

What is claimed is:

1. In a vessel having a deck, the improvement comprising a device for the separation of water immiscible liquid hydrocarbons from water contained within spill rails on the vessel wherein the spill rails have at least one scupper, the device comprising a rigid liquid impermeable body having a top end and a bottom end, the body adapted to be attached on the inside of a spill rail at a scupper and which with the spill rail defines a chamber that has an opening at the bottom end of the body which opening is at a level below the bottom of the scupper.

2. The device of claim 1 wherein the body is substantially rectangular in section.

3. The device of claim 1 including sealing means for providing a liquid seal between the body and a spill rail when the body is attached to a spill rail.

4. The device of claim 1 wherein the rigid body comprises a first plate and two parallel spaced apart side plates that extend perpendicularly from the first plate, the width of first plate and the spacing of the side plates being at least equal to the width of the scupper, the length of the first and side plates being sufficient to extend from the top of the spill rail to at least the bottom of the scupper.

5. The device of claim 4 wherein the side plates include an inverted u-shaped top portion for hanging the device on the spill rail.

6. The device of claim 5 including sealing means comprising flexible flanges on each of the side plates where the side plates contact the spill rail.

7. A method for preventing the discharge of water immiscible hydrocarbons floating on water contained on the deck of a vessel by spill rails, wherein the spill rails have scuppers therein and wherein the scuppers include means for opening and closing them, the method comprising:

attaching a rigid body on the spill rail around the scupper and extending at least to the bottom thereof, the rigid body and the spill rail defining a chamber with a bottom opening; and when the water level is above the bottom opening in the chamber, opening the scupper thereby permitting water to flow into the chamber and out through the scupper; and closing the scupper when the water level approaches the level of the opening of the chamber, thereby preventing the hydrocarbon from being discharged.

* * * * *